United States Patent [19]

Beggs et al.

[11] 4,082,543

[45] Apr. 4, 1978

[54] METHOD FOR REDUCING PARTICULATE IRON OXIDE TO METALLIC IRON WITH SOLID REDUCTANT

[75] Inventors: Donald Beggs, Charlotte, N.C.; Bruce G. Kelley, Fort Mill, S.C.

[73] Assignee: Midrex Corporation, Charlotte, N.C.

[21] Appl. No.: 769,242

[22] Filed: Feb. 16, 1977

[51] Int. Cl.² ............................................. C21B 13/12
[52] U.S. Cl. .......................................... 75/11; 75/26; 75/36
[58] Field of Search .................. 75/11, 10, 33–38, 75/26; 266/137; 423/DIG. 19

[56] References Cited

U.S. PATENT DOCUMENTS

| | | |
|---|---|---|
| 2,786,747 | 3/1957 | Gallusser ................................. 75/11 |
| 2,862,808 | 12/1958 | DeJahn .................................. 75/34 X |
| 2,865,732 | 12/1958 | Jensen .................................... 75/11 |
| 2,932,563 | 4/1960 | Von Haken ......................... 75/34 X |
| 3,427,013 | 2/1969 | Cavanagh ............................... 75/34 |

Primary Examiner—M. J. Andrews
Attorney, Agent, or Firm—Ralph H. Dougherty

[57] ABSTRACT

A method and apparatus for reducing particulate iron oxide to metallic iron utilizing solid carbonaceous fuel as reductant in a shaft type reducing furnace, in which a furnace burden is formed of a mixtue of iron oxide lumps or pellets and particulate solid fuel. Reacted top gas is upgraded and recirculated through the burden in counter-flow relationship thereby heating and partially reducing the burden. The heat for final reduction is generated by passing electric current through the burden.

14 Claims, 6 Drawing Figures

METHOD FOR REDUCING PARTICULATE IRON OXIDE TO METALLIC IRON WITH SOLID REDUCTANT

BACKGROUND OF THE INVENTION

In recent years the direct reduction of iron oxide to metallic iron has become a practical commercial reality with increasing worldwide acceptance and production. The direct reduced iron which results from direct reduction of iron oxide has a commercially demonstrated utility in iron and steelmaking and particularly in electric arc furnace steelmaking. The world demand today for direct reduced iron far exceeds the production capability of existing and planned direct reduction plants, due primarily to the dependence upon natural gas as the energy source in most of the direct reduction processes which have been commercially developed.

To satisfy the short-term and long-term demand for direct reduced iron, it is essential that new and improved direct reduction processes utilize solid fuels such as coal or lignite, to make direct reduction practical in those many countries such as the United States where large reserves of solid fuels are available and natural gas reserves are limited.

In recent years efforts to develop direct reduction processes which utilize solid fuels as the source of reductant for the reduction process have been directed primarily to two different basic types of processes. One type of process mixes solid fuel with iron oxide and processes the mixture in a rotary kiln, using air for combustion in the kiln. A typical example of this process is described in U.S. Pat. No. 3,046,106. The rotary kiln process has a fundamental thermal disadvantage in that approximately 65% of the solid fuel consumed by combustion is required to maintain the high temperature of the kiln, and only about 35% of the fuel value is available for reduction. This results in a solid fuel requirement in the range of 5.0 to 6.0 Giga calories per metric ton of direct reduced iron product.

A second type process gasifies the solid fuel in a separate combustion-type gasifier utilizing oxygen and steam for the gasification. The gas from the gasifier is then cooled and scrubbed, desulfurized, then utilized in a direct reduction furnace as the source of reductant. An example of this combination of gasifier and direct reduction furnace is described in U.S. Pat. No. 3,844,766. This combination also has a fundamental thermal disadvantage in that approximately 50% of the solid fuel is consumed by combustion in the gasifier and only the remaining 50% of the fuel value is available as a source of reductant. This combination, although highly efficient in the use of gas from the gasifier for reduction, requires approximately 4.0 to 5.0 Giga calories of solid fuel per metric ton of direct reduced iron.

In both types of solid fuel direct reduction processes described above, a major portion of the fuel value of the solid fuel is consumed by oxygen from air or from industrial oxygen. In the rotary kiln, only a minor portion is consumed by reaction with oxygen from the iron oxide being reduced.

French Patent 2,274,694 discloses a shaft furnace having a tubular reaction chamber through which the burden passes. The tube is externally heated by burners. The charge to the furnace is iron ore and coke with an optional desulphurizing agent. No provision is made handling the products of reaction nor for utilizing them in the process. The external heating of the tube of this type furnace creates a temperature gradient in the burden because the burden is not a good conductor of heat.

An electrically operated vertical shaft furnace is taught by U.S. Pat. No. 1,937,064 in which broken coke, graphite, silicon carbide or other conductors are charged to form a burden. Molten metal is then poured through the burden while electrical current also flows through the burden, thus refining the molten metal. The burden is a stationary granular mass of carbonaceous material which does not flow through the furnace. The burden also is not the material being treated, unlike the present invention.

Other patents which may be of interest to the reader include Carlsson U.S. Pat. No. 2,089,782, Brugger U.S. Pat. No. 2,755,325 and Southam U.S. Pat. No. 3,161,500.

OBJECTS OF THE INVENTION

Is is the principal object of the present invention to provide a method for directly reducing iron oxide to metallic iron in a shafty type reduction furnace wherein solid fuel is utilized as the reductant source.

It is another object of this invention to provide a method for directly reducing iron oxide in a shaft furnace wherein the energy input requirements are greatly reduced over present commercial direct reduction methods.

It is another object of this invention to provide means for more efficient operation of a direct reduction shaft furnace than was heretofore possible.

It is another object of this invention to provide apparatus for carrying out the above methods.

SUMMARY OF THE INVENTION

The present invention is directed to a direct reduction method utilizing solid fuel in a novel and highly thermally efficient manner wherein the solid fuel is consumed directly in the reduction process by reaction with oxygen from the iron oxide which is being reduced. The overall reactions in the furnace are endothermic, the heat required being supplied by electrically heating the burden. Exclusion of an external source of air or industrial oxygen results in a solid fuel requirement of approximately 2.2 Giga calories per metric ton of direct reduced iron product with an additional electric energy requirement of approximately 700 kWh (0.6 Giga calories) per metric ton of direct reduced iron.

BRIEF DESCRIPTION OF THE SEVERAL VIEWS OF THE DRAWINGS

The present invention will be more readily understood by referring to the following detailed specification and the appended drawings in which.

DETAILED DESCRIPTION

Figure 1:
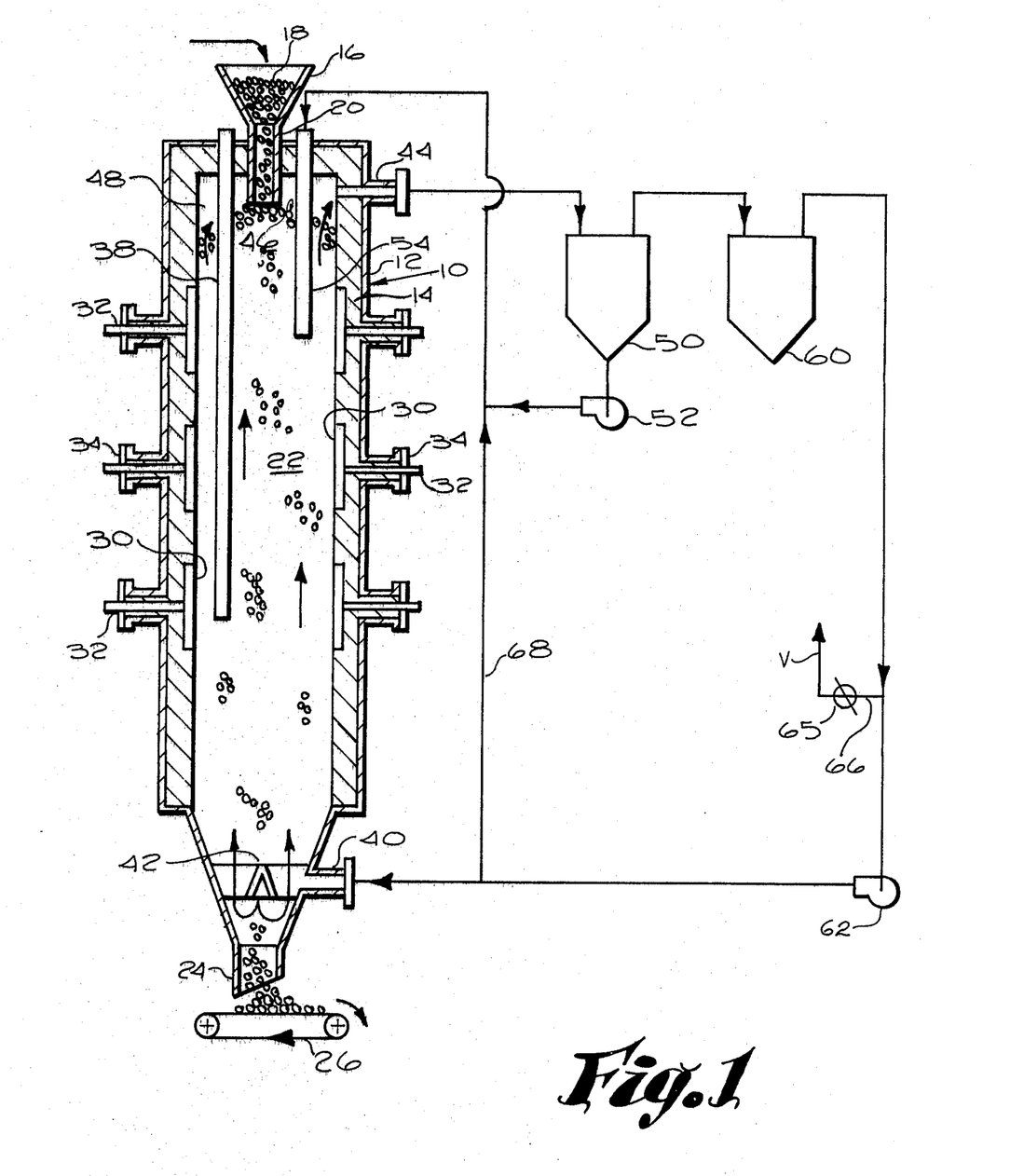
FIG. 1 is a schematic cross section of an elevational view of the shaft furnace of the present invention showing gas flows and related equipment.

Referring now to the embodiment of FIG. 1, a shaft type furnace 10 having a steel shell 12 is lined with refractory 14. A feed hopper 16 is mounted at the top of furnace 10 for charging of particulate solids feed material 18 therein. The feed material consists of iron oxide in the form of pellets or lumps, and solid carbonaceous fuel. The feed material descends by gravity through one or more feed pipes 20 to form a packed bed 22 of particulate solids feed material or burden in the furnace 10. Reduced product is removed from the furnace by discharge conveyor 26 located beneath discharge pipe 24. Removal of the reduced product, which is in the form of metallized pellets or lumps from discharge pipe 24 establishes a gravitational flow of the particulate burden 22 through shaft furnace 10.

The furnace 10 is preferably square or rectangular in horizontal cross section. The middle region of the furnace is provided with heat resistant alloy electrode plates 30 connected to electrode lead rods 32, which are in turn connected to an electric power source not shown. Electrode plates 30 are preferably recessed into the refractory wall 14 to create a substantially smooth interior wall face. The electrode plates are so positioned to form opposing pairs. Three opposing pairs of electrode plates are shown in FIG. 1, vertically spaced through the furnace for reasons of process control. The electrode lead rods 32 are mounted on suitable electrical insulating material 34 such as asbestos board which serves to insulate the rod 32 from the steel furnace shell 12. A heat resistance alloy pipe 38 having a closed lower end extends vertically through the furnace roof and into the burden as far as the region of the lower most pair of electrode plates 30. Suitable thermocouples, not shown, are inserted into the thermocouple pipe 38 to sense the temperature of the burden at selected elevations, particularly at the elevation of each pair of electrode plates.

Top gas exits the furnace through a top gas outlet pipe 44 located above stock line 46. The lower end of feed pipe 20 extends below outlet pipe 44, which arrangement creates a top gas disengaging plenum 48 which permits the top gas to exit generally symmetrically from the stock line 46 and flow freely to the top gas outlet pipe 44.

A gas cleaning and recirculating circuit is provided to remove solids and condensible matter from the top gas and to cool the gas to form cold process gas. The reacted top gas leaving the shaft furnace 10 through pipe 44 flows to an oil scrubber 50 wherein tars, oils, and particulates are removed from the gas as a sludge. Pump 52 pumps the sludge back through the furnace through sludge injection pipe 54 which has an open lower end extending well beneath the stock line to insure reaction of sludge components with the burden to prevent top gas from recycling these components back into the oil scrubber.

The top gas passes from the oil scrubber to a water scrubber 60 wherein the gas is further cooled and cleaned. A gas recirculating blower 62 draws the cooled and cleaned process gas from the scrubber 60. A valve 65 is provided in pipe 66 as required. A portion of the process gas is introduced to pipe 68 to assist in injecting the sludge into the shaft furnace burden. The major portion of the process gas is reintroduced to the furnace as cold process gas through gas inlet pipe 40 through a gas distributing member 42 located within the furnace. Some process gas must normally be vented because when solid carbon in the furnace reacts with oxygen from the iron oxide, carbon monoxide gas and carbon dioxide gas are formed. Since this reaction involves a gaseous expansion, excess gas may be vented through vent V. Of course, this excess gas provides a source of energy for use elsewhere.

Figure 2:
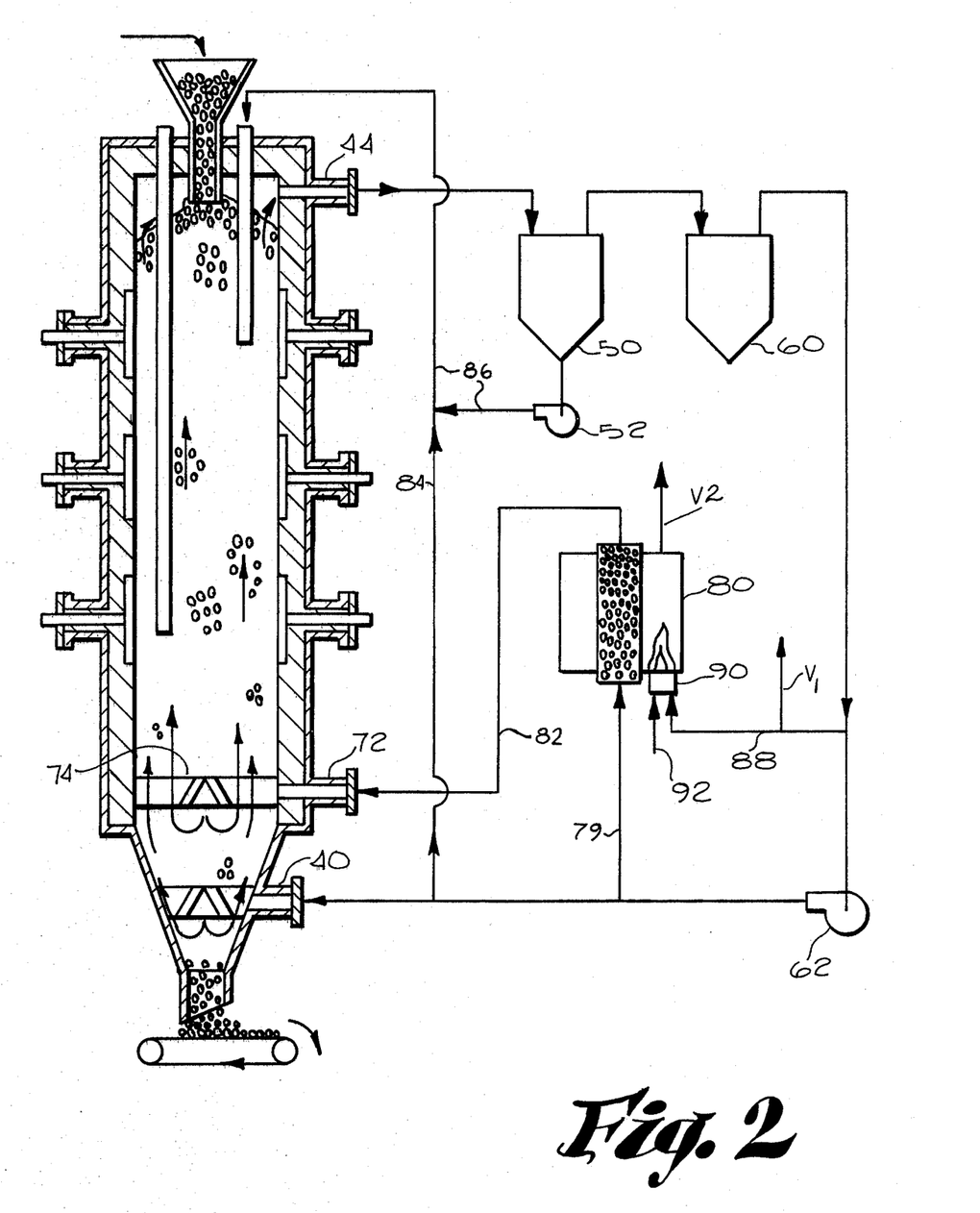
FIG. 2 is an elevational cross section of an alternative embodiment of the present invention.

An alternative embodiment of the invention depicted in FIG. 2 includes provision for introducing both cold process gas and hot process gas into the lower region of the furnace beneath the electrodes. Cold process gas is introduced through the cold process gas inlet pipe 40 in the same manner as the embodiment of FIG. 1. Hot process gas is introduced to the burden through hot process gas inlet pipe 72 and gas distributing member 74 located within the furnace. The region between the cold process gas distributing member and the hot process gas distributing member acts as a cooling zone to cool the hot product prior to discharge.

The top gas leaves the burden at the stock line and exits the furnace through top gas takeoff pipe 44. The top gas is cleaned of tars, oils, and particulates in oil scrubber 50, then further cleaned and cooled in water scrubber 60. A portion of the process gas is reintroduced to the furnace as cold process gas through process gas inlet 40. A second portion of the process gas passes through pipe 79 into gas preheater 80. The heated gas flows through pipe 82 and is introduced to the furnace through hot process gas inlet 72. A third portion of cold process gas is directed through pipe 84 and is injected into sludge return line 86 to assist in carrying the sludge back to the furnace. Another portion of the process gas is fed into pipe 88 as fuel for preheater burner 90. A vent $V_1$, is provided in pipe 88 to vent a portion of the cooled process gas, as required. Combustion air for the burner 90 is provided by air source 92. Vent $V_2$ removes the products of combustion from preheater 80.

Figure 3:
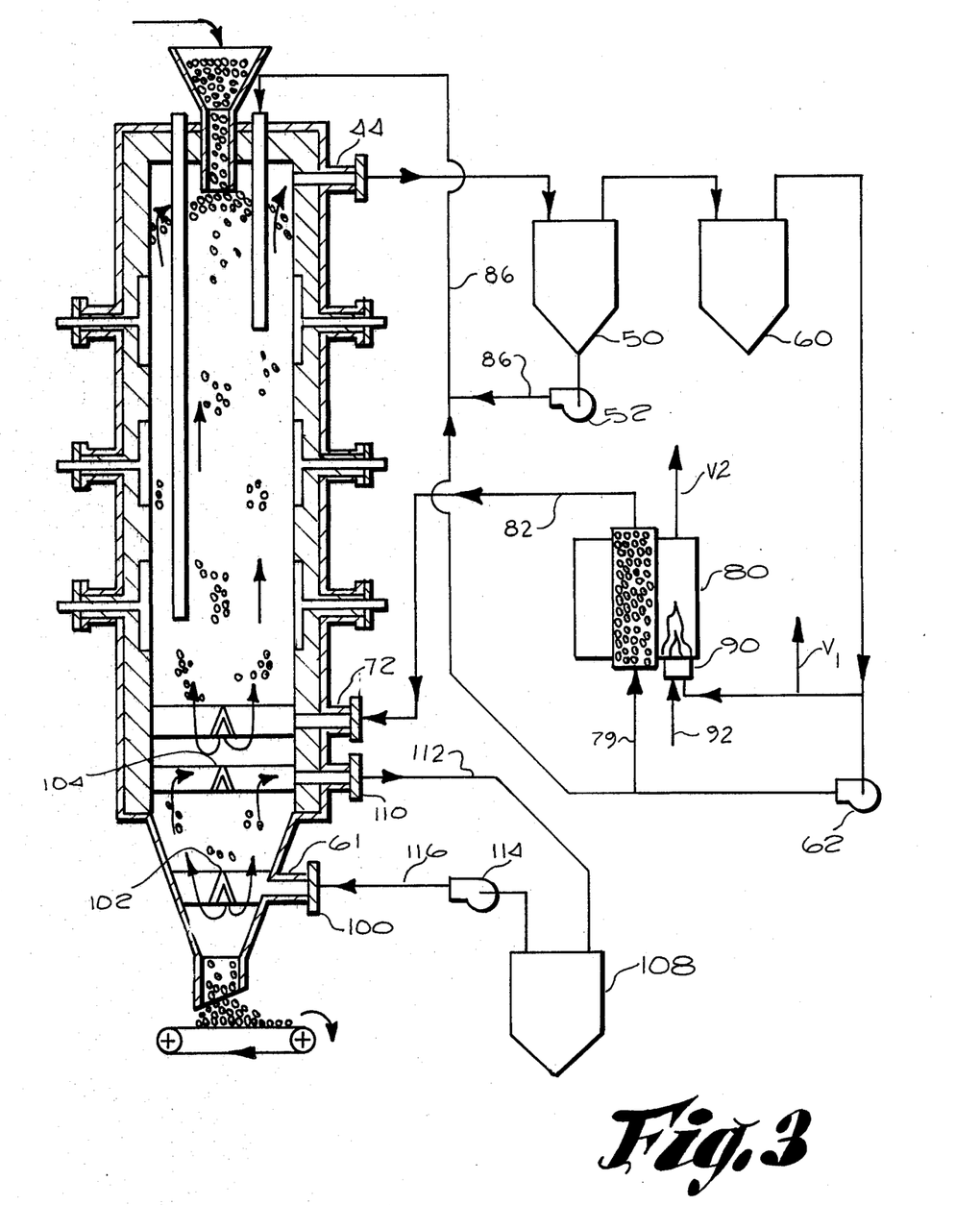
FIG. 3 is an elevational cross section of another alternative embodiment of the present invention.

The embodiment of FIG. 3 includes a cooling zone in the lower portion of the furnace whereby cooling gas is admitted to the furnace through cooling gas inlet 100 and cooling gas distributor 102 within the furnace. A cooling gas collecting member 104, which is positioned above gas distributing member 102 communicates with scrubber-cooler 108 through cooling gas outlet 110 and pipe 112. A recirculating gas blower 114 is positioned in pipe 116 or any other convenient location within the cooling gas circuit to provide the impetus for gas flow. The cooling gas circuit includes the cooling zone of the furnace which is that portion of the furnace between the cooling gas distributing member 102 and the cooling gas collecting member 104.

In this FIG. 3 embodiment, only preheated process gas is introduced to the process gas inlet pipe 72. The remainder of the apparatus of FIG. 3 approximates that of FIG. 2.

Figure 4:
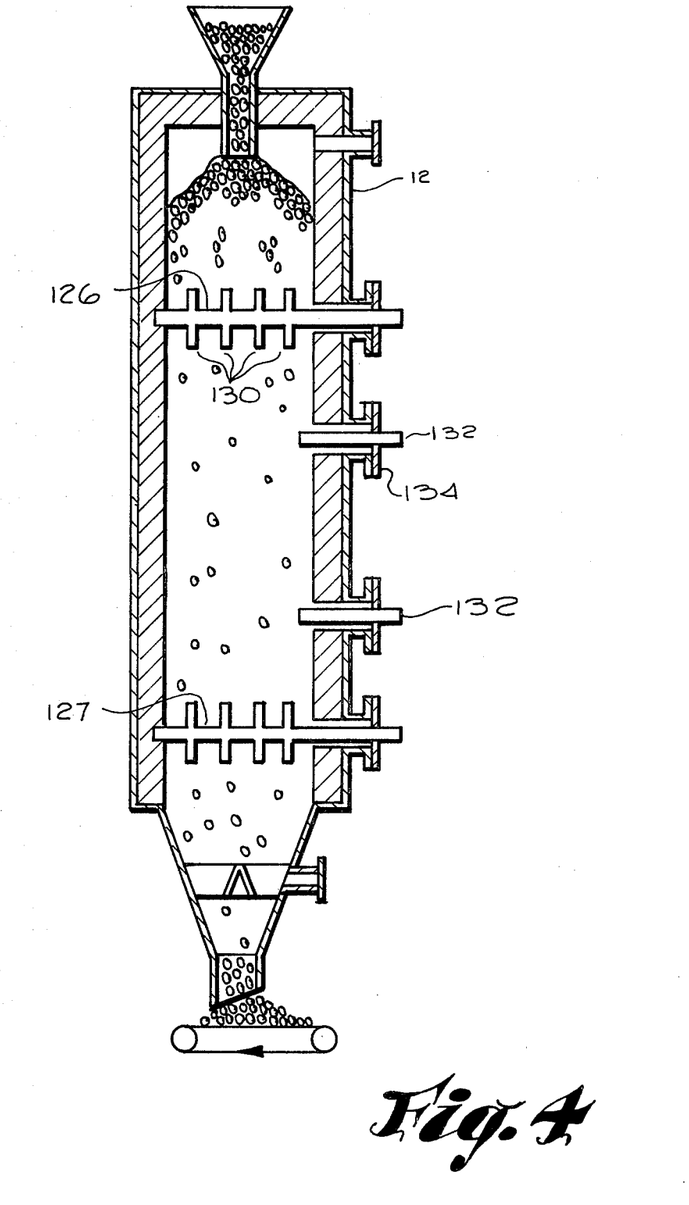
FIG. 4 is a schematic diagram showing vertically spaced electrodes as alternative means for providing electric heat to the shaft furnace burden.

An alternative arrangement for applying the electric power through the burden in a vertical direction is depicted in FIG. 4 wherein heat resistant alloy electrodes consisting of rods 126 and 127, one only of each being shown, extend through one wall of the casing 12 and across the furnace width terminating in the refractory wall on the opposite side of the furnace. Electrodes are provided at the upper and lower regions of the furnace as indicated in the drawing. Each rod may be equipped with heat resistant alloy discs 130 to provide an extended electrode surface area. The number of electrode rods employed is dependent upon the horizontal dimension of the furnace. When the electrodes are arranged to pass current vertically as depicted in FIG. 4, the furnace can have any desired cross-section including nearly every geometric shape such as square, round, rectangular, oval, etc.

Burden thermocouples 132 extend into the furnace at selected location heights through the sidewalls and are seated in electrical insulators 134 which engage the furnace casing 12. These thermocouples sense the temperature of the burden at the various locations as the burden passes through the furnace.

Figures 5, 6:
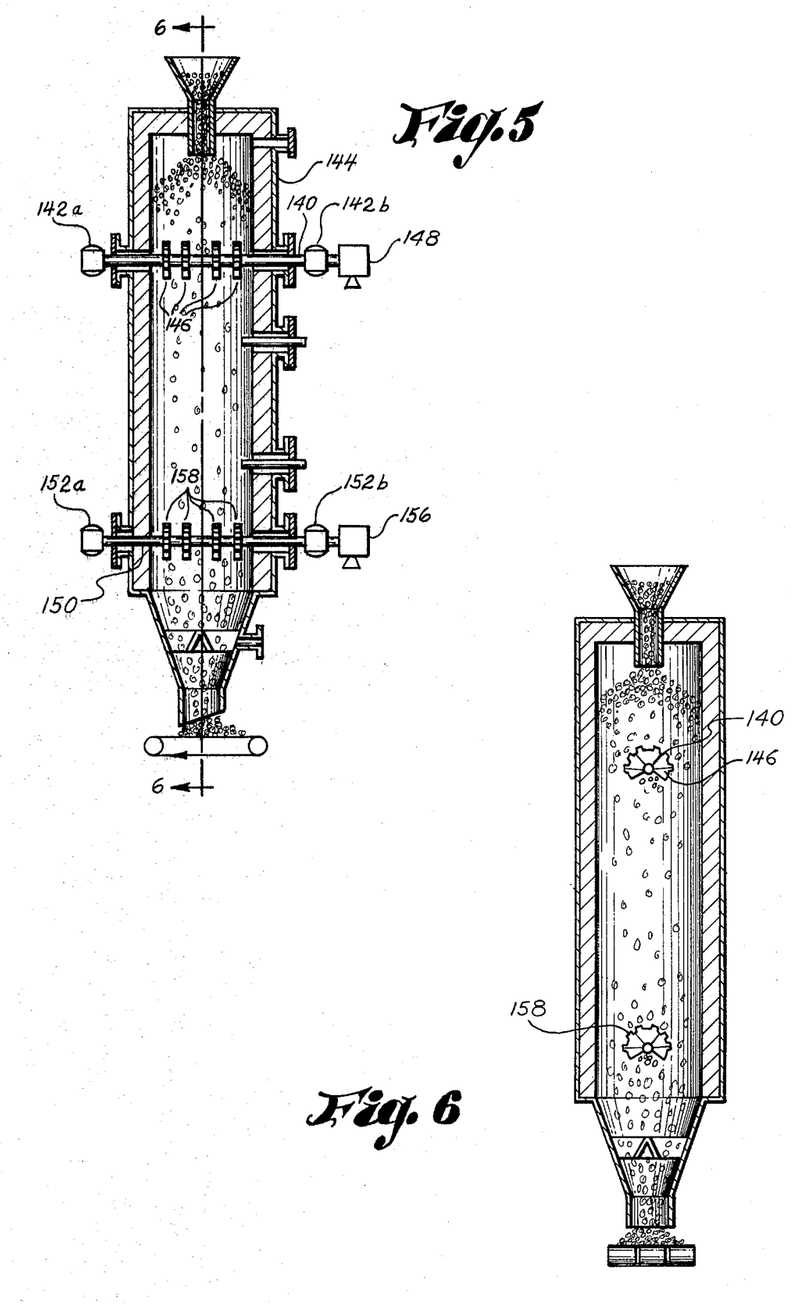
FIG. 5 is a schematic cross-section of an elevational view of the furnace of FIG. 4 showing modifications to the electrodes.
FIG. 6 is a schematic cross section of an elevational view of the furnace of FIG. 5 taken through the line 6—6 of FIG. 5.

In the embodiment of FIG. 5, which is an alternative arrangement to that of FIG. 4, upper electrode 140 is journaled for rotation in bearings 142a and 142b which may be mounted externally as shown or insulated and mounted in the furnace walls 144.

One or more of these upper electrodes are provided, depending upon the dimensions of the horizontal cross-section of the furnace. The upper electrode acts as a feeder mechanism as well as a cluster breaker for material in the upper zone of the furnace. The electrode carries one or more radially extending breaker segments 146, best shown in FIG. 6. Upper electrode 140 is connected to and driven by oscillatible drive mechanism 148. At least one lower electrode 150 is provided which is journaled for rotation in insulated and sealed bearings 152a and 152b. These bearings may be in the walls of the furnace or mounted externally. Lower electrode 150 is connected to and driven by oscillatible drive mechanism 156. The lower electrode carries one or more radially extending arcuate breaker segments 158 and thus acts as a lower cluster breaker. Each cluster breaker segment extends only about 180° to 270° about the electrode. Thus as the electrode oscillates within the bearings, it acts as both a feed mechanism and cluster breaker mechanism. It feeds material alternately by moving material downwardly from opposite walls of the furnace while simultaneously breaking any clusters of the hot cohesive material.

In the method of this invention, iron oxide pellets, lump ore or other suitable ion oxide feed material is mixed with solid carbonaceous fuel such as coal, coke, or lignite, then fed through feed pipe 20 to the interior of the furnace 10 to form burden 22 therein as a packed bed.

The furnace is heated electro-thermally by passing electric current through the burden between alloy electrodes in the furnace. Directly reduced iron pellets or lumps are electrically conductive even at the earliest stage of reduction when metallic iron is formed only on the pellet surface. When starting up operation of the electric powered shaft furnace of the present invention, the furnace is charged with partially metallized directly reduced iron pellets, petroleum coke or any other electrically conductive material. After a plant has been operating, reduced or partially metallized pellets would be readily available for a startup charge. However, other conductive materials are utilized when reduced or partially metallized pellets are unavailable. It has been determined that pellets with metallizations as low as 6% are conductive.

The shaft furnace includes three distinct process zones. The upper region constitutes a prereduction zone in which the burden is heated by convection of gases moving in counter-flow relation to the flow of the burden. Coal or other carbonaceous fuel in the feed liberates condensible and noncondensible volatiles. The noncondensible volatiles, which are mostly hydrogen or hydrocarbons, exit as top gas, are cleaned and recirculated as process gas. The pellet burden acts as a moving packed bed pebble quench which is very effective in preventing heavy liquid compounds from plugging gas outlet pipes. Some heavy oils and tars tend to weep out of the coal and are absorbed by the oxide feed to subsequently react with the $CO_2$ and water vapor in the process gas. A high ratio of oxide feed to heavy liquid compounds reduces the tendency to the burden to cluster excessively near the burden stockline. In this prereduction zone, the oxide feed material is reduced to low metallization, i.e. metallization less than 25%, by reaction with reductants $H_2$ and CO in the upwardly moving gases. Thus the burden becomes electrically conductive before it leaves the prereduction zone.

The central region of the shaft furnace constitutes a reduction zone in which metallic iron is formed by reaction of the char formed from the carbonaceous fuel with oxygen from the iron oxide. The reactions in the reduction zones are endothermic. The required heat in the reduction zone is supplied electro-thermally.

The lower region of the furnace constitutes a cooling zone wherein cold process gas or other cooling gas is passed through the hot product prior to discharge. Cold process gas enters the cooling zone through inlet 40 as in FIGS. 1 or 2, or a cooling gas circuit recirculates gas through the cooling zone between inlet 100 and outlet 110 of FIG. 3.

The product discharge from the shaft furnace contains reduced iron, ash from the coal and some residual char having very small particle size. The discharge product is screened to separate the reduced pellets, then the screen undersize is passed through a magnetic separator to recover the reduced product fines.

A small amount, up to 5 weight percent, of limestone or dolomite may be added to the feed material to react with sulfur which may be liberated within the furnace. This nonmetallic material will be rejected from the direct reduced iron product by magnetic separator.

As a specific example of the operation of each of the furnaces in FIGS. 1 through 4 calculations have been made regarding the gas flow rates, gas temperatures and gas compositions at a number of locations in each furnace flow diagram. These calculations have been based on an oxide feed analysis of 97% $Fe_2O_3$, with 3% gangue materials. Ten percent more coal than is theoretically required, having a proximate analysis of 57.6% fixed carbon, 3.3% water, 29.0% volatiles and 10.1% ash was used as a basis for these calculations. This is a high volatile grade A bituminous coal. The tar and oil yield from the coal is about 0.11 cubic meters per metric ton. Tars and oil present in the top gas are 22,000 milligrams per normal cubic meter. The temperature in the reducing zone is 980° C. The metallization of the ultimate product is 92% with the metallization taking place in the prereduction zone being 20%. The use of excess coal will result in unreacted char discharging from the furnace with the metallic iron product. This char can be magnetically separated from the iron product and separated from ash by flotation or other suitable means. The resultant char can be recycled into the furnace which will reduce the coal requirement substantially to theoretical.

Tables 1 through 3 show computed operating figures for a direct reduction furnace operated in accordance with the invention. The gas analyses are typical operating figures at the locations indicated by the letter headings. These locations are as follows:
A. Top gas upon exit from top gas outlet 44.
B. Gas exiting water-scrubber 60.
C. Gas passing through vent V or $V_1$.
D. Gas entering furnace through inlet 72.
E. Gas entering furnace inlet 40.
F. Gas being admitted to burner 90 through line 88.
G. Cooling gas removed from cooling zone through outlet 110.
H. Cooling gas introduced to cooling zone through inlet 100.

Gas flows in the tables are given in normal cubic meters per metric ton ($Nm^3/t$) of Product.

Table 1 shows the operating figures for a direct reduction furnace being operated in accordance with either FIG. 1 or FIG. 4.

TABLE 1

|  | A | B | C | E | Gas Into Reduction Zone | Gas Out of Reduction Zpne |
|---|---|---|---|---|---|---|
| Flow-($Nm^3$/t Prod.) | 1300 | 1260 | 500 | 760 | 760 | 1280 |
| Temp. - °C | 360 | 40 | 40 | 40 | 640 | 980 |
| Analysis - %CO | 49.1 | 50.7 | 50.7 | 50.7 | 53.9 | 65.6 |
| %$CO_2$ | 23.3 | 24.1 | 24.1 | 24.1 | 20.9 | 8.3 |
| %$H_2$ | 17.0 | 17.6 | 17.6 | 17.6 | 14.4 | 21.0 |
| %$H_2O$ | 9.0 | 6.0 | 6.0 | 6.0 | 9.2 | 4.5 |
| %$CH_4$ | 0.9 | 0.9 | 0.9 | 0.9 | 0.9 | 0.0 |
| %$N_2$ | 0.7 | 0.7 | 0.7 | 0.7 | 0.7 | 0.6 |

Table 2 shows operating figures for a direct reduction furnace according to the invention being operated with the apparatus depicted in FIG. 2

TABLE II

|  | A | B | C | D | E | F | Gas Into Reduction Zone | Gas Out of Reduction Zone |
|---|---|---|---|---|---|---|---|---|
| Flow -($Nm^3$/t Prod.) | 1300 | 1260 | 490 | 35 | 725 | 10 | 760 | 1280 |
| Temp. - °C | 360 | 40 | 40 | 980 | 40 | 40 | 680 | 980 |
| Analysis - %CO | 49.1 | 50.7 | 50.7 | 53.9 | 50.7 | 50.7 | 53.9 | 65.6 |
| %$CO_2$ | 23.3 | 24.1 | 24.1 | 20.9 | 24.1 | 24.1 | 20.9 | 8.3 |
| %$H_2$ | 17.0 | 17.6 | 17.6 | 14.4 | 17.6 | 17.6 | 14.4 | 21.0 |
| %$H_2O$ | 9.0 | 6.0 | 6.0 | 9.2 | 6.0 | 6.0 | 9.2 | 4.5 |
| %$CH_4$ | 0.9 | 0.9 | 0.9 | 0.9 | 0.9 | 0.9 | 0.9 | 0.0 |
| %$N_2$ | 0.7 | 0.7 | 0.7 | 0.7 | 0.7 | 0.7 | 0.7 | 0.6 |

Table 3 shows operating figures for a direct reduction furnace being operated in accordance with the invention with the apparatus depicted in FIG. 3.

TABLE III

|  | A | B | C | D | F | G | H | Gas Into Reduction Zone | Gas Out of Reduction Zone |
|---|---|---|---|---|---|---|---|---|---|
| Flow-($Nm^3$/t Prod.) | 1300 | 1260 | 260 | 760 | 240 | 725 | 725 | 760 | 1280 |
| Temp. - °C | 360 | 40 | 40 | 980 | 40 | 660 | 40 | 980 | 980 |
| Analysis %CO | 49.1 | 50.7 | 50.7 | 53.9 | 50.7 |  |  | 53.9 | 65.6 |
| %$CO_2$ | 23.3 | 24.1 | 24.1 | 20.9 | 24.1 |  |  | 20.9 | 8.3 |
| %$H_2$ | 17.0 | 17.6 | 17.6 | 14.4 | 17.6 |  |  | 14.4 | 21.0 |
| %$H_2O$ | 9.0 | 6.0 | 6.0 | 9.2 | 6.0 |  |  | 9.2 | 4.5 |
| %$CH_4$ | 0.9 | 0.9 | 0.9 | 0.9 | 0.9 |  |  | 0.9 | 0.0 |
| %$N_2$ | 0.7 | 0.7 | 0.7 | 0.7 | 0.7 |  |  | 0.7 | 0.6 |

The energy required to operate the furnaces of FIGS. 1, 2 and 3 are shown in Table 4

TABLE IV

| ENERGY REQUIREMENTS | | |
|---|---|---|
|  | Coal - Gcal/t | Power - kWh/t |
| Figure 1 Furnace | 2.17 | 826 |
| Figure 2 Furnace | 2.17 | 811 |
| Figure 3 Furnace | 2.17 | 700 |

Note that the power requirements for the furnace of FIGS. 1 and 2 are substantially equal and for the furnace of FIG. 3 which is slightly more efficient, it is slightly less.

Tests were conducted to determine the electrical resistance of nominal 12 mm diameter metallized pellets having varying degrees of metallization. Table 5 is a tabulation taken from a plot of the results of these tests:

TABLE V

| Degree of Metallization | Resistance in Ohms per Pellet |
|---|---|
| 10% | 0.19 |
| 25% | 0.14 |
| 50% | 0.06 |
| 75% | 0.025 |
| 95% | 0.02 |

Tests have also been conducted to determine the electrical resistance at various temperatures of a packed bed burden consisting of 89% nominal 12 mm diameter pellets of approximately 90% metallization, 10% nominal 12 mm diameter coal char from low volatile bituminous coal and 1% limestone of nominal 6 mm diameter. In Table 6 the resistivity represents the resistance through a burden having a face area one meter square and a resistance path depth of 1 meter. The table represents points taken from a curve of plotted data points:

TABLE VI

| Temperature | Resistivity in Ohm-Meters |
|---|---|
| 100° C | .0055 |
| 300° C | .0033 |
| 500° C | .0020 |
| 700° C | .0012 |
| 900° C | .0007 |

The preferred reduction temperature in the furnace of the present invention is in the range of 900° to 1000° C. The burden resistivity in this temperature range at either low or high metallizations requires relatively high current at relatively low voltage which makes practical the resistance heating of the burden without need for sophisticated electrical insulation or grounding means.

SUMMARY OF THE ACHIEVEMENTS OF THE OBJECTS OF THE INVENTION

It is clear from the above that we have invented a method and apparatus for directly reducing iron oxide to metallic iron in a shaft type reduction furnace utilizing solid fuel as the reductant source in which energy input requirements are greatly reduced over present commercial direct reduction plants and with more efficient operation than was heretofore possible.

It is to be understood that the foregoing description and specific examples are illustrative of the principles of the invention and that various modifications and additions may be made thereto by those skilled in the art without departing from the spirit and scope of the invention as set forth in the following claims.

What is claimed is:

1. A method of reducing particulate iron oxide material to metallic iron with a solid reductant comprising:
   continuously feeding particulate iron oxide and solid particulate carbonaceous fuel to a particle inlet at the top of a shaft furnace to establish a packed burden therein;
   removing particulate product from a particle outlet at the bottom of said burden through said furnace;
   passing an electric current through the burden to provide sufficient heat by direct resistance heating to react said carbonaceous fuel with oxygen from said particulate iron oxide to reduce said iron oxide substantially to metallic iron;
   causing the reaction products to move through said burden in counterflow relation with it, and form a top gas;
   removing top gas from the upper region of the shaft furnace; cooling said top gas; and
   recirculating the cooled gas to the burden through a gas inlet at the lower region of said furnace.

2. A method according to claim 1 further comprising forming a solid unreacted char from said carbonaceous fuel, removing said char from said furnace with said particulate product, separating char from the particulate product and recharging said separated char into said furnace as particulate carbonaceous fuel.

3. A method according to claim 1 wherein said particulate carbonaceous fuel is coal.

4. A method according to claim 1 wherein said particulate carbonaceous fuel is a mixture of unreacted char and coal.

5. A method according to claim 1 wherein said particulate carbonaceous fuel is lignite.

6. A method according to claim 1 wherein said particulate carbonaceous fuel is coke.

7. A method according to claim 1 further comprising adding up to 5 weight percent of limestone, dolomite, or a mixture thereof to said feed material.

8. A method according to claim 1 further comprising cleaning said removed top gas in a scrubber, and returning the scrubber underflow to the interior of said furnace beneath the stock line of said burden.

9. A method according to claim 8 further comprising injecting a portion of the cleaned top gas into the scrubber underflow to assist in returning the underflow to said furnace.

10. A method according to claim 1 further comprising preheating said cleaned cooled top gas prior to returning it to said furnace.

11. A method according to claim 1 further comprising introducing a cooling gas into a cooling zone in the bottom of said furnace, removing heated cooling gas at the top of said cooling zone, cooling and cleaning said heated cooling gas, and returning it to said cooling zone.

12. A method according to claim 1 wherein said electric current is passed substantially vertically through said burden.

13. A method according to claim 1 wherein said electric current is passed horizontally through said burden.

14. A method according to claim 12 wherein said current is passed through horizontally oriented electrodes which are reciprocated about their longitudinal axes to break clusters of pellets and burden material in said furnace.

* * * * *